United States Patent [19]
Brock et al.

[11] 3,874,523

[45] Apr. 1, 1975

[54] ASPHALT MIX PREPARATION AND STORAGE PLANT

[75] Inventors: James Donald Brock; Erbie Gail Mize, both of Chattanooga, Tenn.; Herbert Edward Jakob, Raleigh, N.C.

[73] Assignee: CMI Corporation, Oklahoma City, Okla.

[22] Filed: Dec. 13, 1972

[21] Appl. No.: 314,842

[52] U.S. Cl. ................. 214/17 R, 92/71, 187/29 B, 214/100, 214/127, 417/269
[51] Int. Cl. ............................................. B66b 9/04
[58] Field of Search .......... 214/17 R, 17 C, 41, 100, 214/127; 187/29 A, 29 B; 92/71; 417/269

[56] References Cited
UNITED STATES PATENTS

| | | | |
|---|---|---|---|
| 1,513,580 | 10/1924 | Case | 214/127 |
| 3,108,545 | 10/1963 | Bauer | 92/71 |
| 3,292,554 | 12/1966 | Hessler | 417/269 |
| 3,722,718 | 3/1973 | Gill et al. | 214/41 X |

Primary Examiner—Robert G. Sheridan
Attorney, Agent, or Firm—Dunlap & Codding

[57] ABSTRACT

An asphalt preparation and storage plant includes an elevated asphalt mixer arranged to gravity dispense mix to a transport vehicle below the mixer, or to dispense the mix to the carrier of an inclined hoist. The hoist is operated with a fluid powered motor and a constantly driven variable displacement piston pump, and a counterweight is attached to the cable of the hoist. The incline of the hoist, the weight of the carrier, the approximate maximum weight capacity rating of the carrier and the effective weight of the counterweight are matched so that the force required by the drive means to move a fully loaded carrier up the incline from the mixing plant to the surge hopper is approximately the same as the force required by the drive means to urge the empty carrier down the incline against the effective weight of the counterweight.

7 Claims, 2 Drawing Figures

3,874,523

ASPHALT MIX PREPARATION AND STORAGE PLANT

BACKGROUND OF THE INVENTION

Asphalt mix preparation and storage plants typically comprise an asphalt mixing plant and one or more surge hoppers or storage silos. The mixing plants and surge hoppers are usually elevated above ground level so as to provide a transport vehicle loading area to admit dump trucks or other transport vehicles therebeneath for loading purposes. A batch of mix can be dumped directly from an elevated asphalt mixing plant by gravity feed to an awaiting truck for transportation to a construction site, or in the alternative, a batch of mix from the asphalt mixing plant can be transferred to a surge hopper, temporarily stored, and subsequently dispensed to a transport vehicle. The device used to transfer the mix from the mixing plant to the surge hopper can comprise a continuous conveyor, such as a drag chain conveyor, or an intermittent conveyor, such as a skip hoist. When the asphalt mixing plant is the batch-type mixer, the skip hoist conveyor is suitable for conveying the mix up the incline from the discharge chute at the lower portion of the mixing plant to the upper end of the surge hopper by having the bucket or carrier of the skip hoist receive an entire batch of mix from the mixing plant and convey it to the surge hopper while the mixing plant prepares the next batch of mix.

The skip hoist arrangements used in the past have been relatively slow in operation and have required powerful drive means for moving the loaded carrier up the incline from the outlet of the mixing plant to the top of the surge hopper. The typical drive mechanism to move the carrier of the hoist comprises a cable connected at one of its ends to the carrier and extending up the hoist and over a pulley, and then extending to an electrically operated winch having a drum which alternately winds in and pays out the cable to alternately move the carrier up and down the incline of the hoist. Maximum power is required from the winch to convey the loaded carrier up the incline from the mixing plant to the surge hopper, while the weight of the carrier allows the cable to merely pay out from the winch as the empty carrier moves down the incline to its return position. In addition, the track on which the carrier travels frequently is constructed with a horizontal section at the outlet of the mixing plant so that the winch can accelerate the loaded carrier from its standstill position at the outlet chute of the mixing plant along a horizontal path before the carrier is required to begin its long, slow climb up the inclined portion of the track, where acceleration of the carrier is much more difficult. Usually, the winch construction is such that the loaded carrier accelerates to its top speed along the winch track in a short distance. The winch reaches its top speed, a relatively low speed, in just a few feet of carrier travel.

SUMMARY OF THE INVENTION

Briefly described, the present invention comprises an asphalt mixing and storage plant with an elevated asphalt mixing plant arranged to gravity dispense batches of asphalt mix to transport vehicles and to the carrier of a hoist which moves the mix up an incline from the discharge chute of the asphalt mixing plant to the upper end of an elevated surge hopper. The hoist structure utilized to transfer the mix from the asphalt mixing plant to the surge hopper includes a counterweight system connected to the carrier cable and which is matched with the maximum incline of the track of the hoist, the weight of the empty carrier, and the weight of the carrier and its load, so that the drive means used to move the carrier between the mixing plant and the surge hopper utilizes approximately equal driving force to move the empty carrier down the incline of its track as it does to move the loaded carrier up the incline of its track. The driving means comprises a continuously driven variable displacement piston pump arranged to drive a fluid motor connected to the winch drum. The arrangement is such that the carrier can accelerate in its movement along the track over a major portion of the length of the track, even though a relatively low powered driving means is used to continuously operate the variable displacement piston pump.

Thus, it is an object of the present invention to provide an asphalt mixing and storage plant which allows two mix transport vehicles to be loaded simultaneously, and which provides for the continual dispensing of batches of mix from the mixing plant to the surge silo when transport vehicles are not available for transporting the mix from the mixing plant.

Another object of the present invention is to provide an asphalt mixing and storage plant which expediently transfers mix from the asphalt mixing plant to the surge hopper with the use of relatively low powered and efficient mix transfer means.

Other objects, features and advantages of the present invention will become apparent upon reading the following specification, when taken in conjunction with the accompanying drawing.

DESCRIPTION OF A PREFERRED EMBODIMENT

Figure 1:
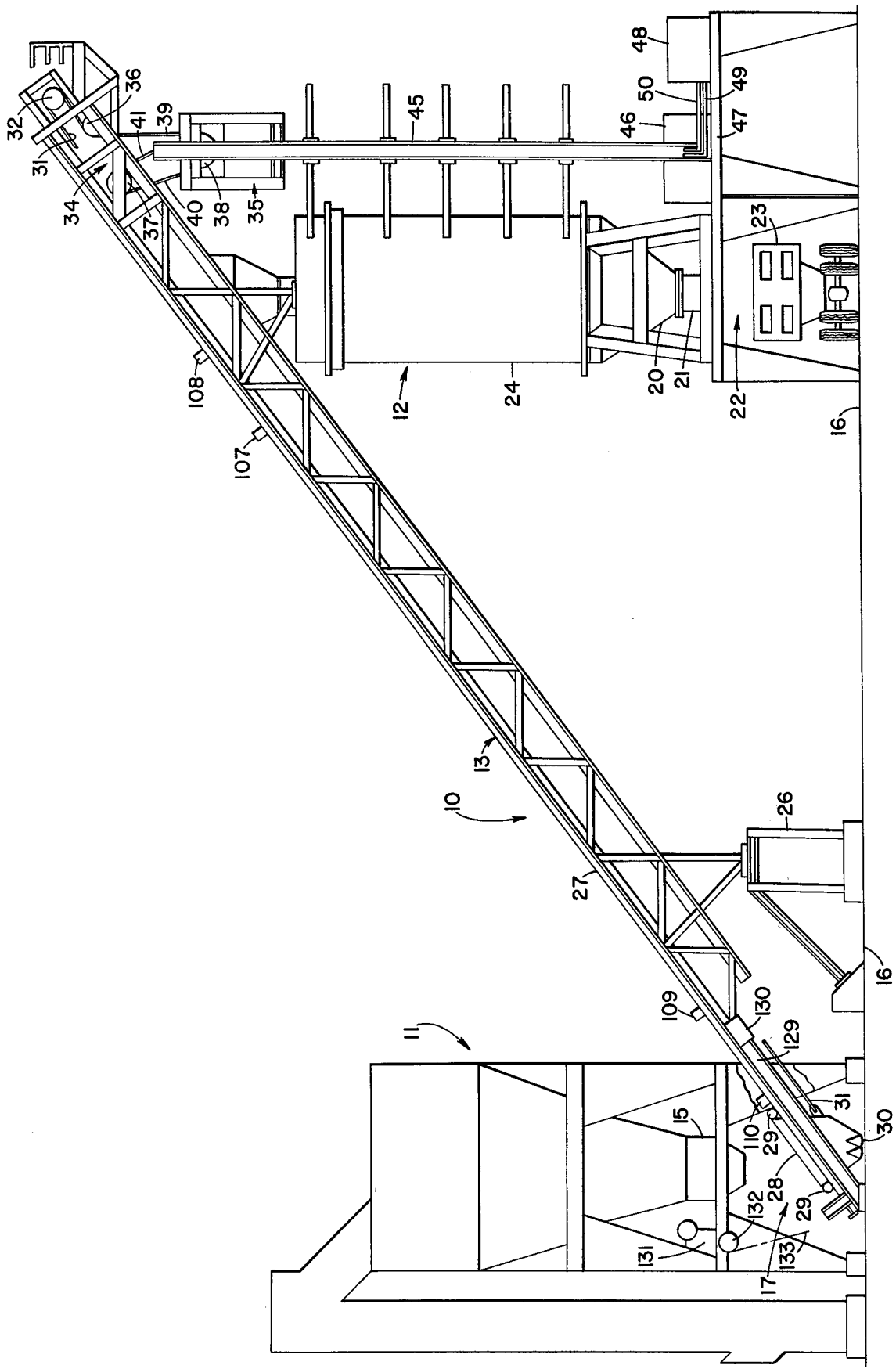
FIG. 1 is a side elevational view of a surge hopper, a hoist, and an asphalt mixing plant.

Referring now in more detail to the drawing, in which like numerals indicate like parts throughout the views, FIG. 1 illustrates an asphalt mixing and storage plant 10 which comprises asphalt mixing plant 11, asphalt mix storage silo or surge hopper 12, and hoist means 13. Asphalt mixing plant 11 is elevated and comprises a gravity feed mix discharge chute 15 displaced above ground level 16, and a vehicle loading station 17 is defined beneath discharge chute 15. The vehicle loading station 17 is arranged to admit a typical dump truck or other conventional mix transport vehicle so that the mix can be gravity fed from discharge chute 15 in a downward direction to the bed of the dump truck.

Asphalt mix surge hopper 12 comprises a lower converging portion 20 with a discharge chute 21 displaced above ground level 16 so as to define a vehicle loading station 22 therebeneath. As with the asphalt mixing plant 11, the asphalt mix surge hopper 12 is arranged to dispense mix in a downward direction under the influence of gravity from mix discharge chute 21 to an awaiting mix transport vehicle, such as dump truck 23. The upper end of the cylindrical portion 24 of storage hopper 12 is constructed to receive mix from hoist means 13.

Hoist means 13 comprises a support such as truss support 26, and track means 27 such as a pair of spaced-apart rails disposed on an incline from vehicle loading station 27 beneath asphalt mixing plant 11 and the upper end of asphalt mix surge hopper 12. A carrier such as car 28 is mounted on track means 27 by its rotatable wheels 29 engaging the rails of the track means. Carrier 28 is open at its upper end to receive mix from mixing plant 11 and is closed at its lower end by clam gates 30. Cable means such as twisted fibrous metal cable 31 has one of its ends connected to carrier 28 and extends up track means 27 and around winch drum 32 at the upper end of track means 27. Fluid motor 33 (not shown in FIG. 1) is connected to winch drum 32. Cable 31 can be wrapped around winch drum 32 any number of times in order to create the frictional contact between the cable 31 and the winch drum 32 which is necessary for the winch drum to drive the cable. The portion of the cable paying off winch drum 32 as the carrier 28 moves up track means 27 extends about pulley arrangement 34, and the other end of cable 31 is connected to counterweight 35. Pulley arrangement 34 comprises first and second pulleys 36 and 37 rotatably connected to the truss of track means 27 beyond the upper end of storage hopper 12, and counterweight pulley 38 rotatably connected to counterweight 35. The portion of the cable which pays off winch drum 32 as carrier 28 moves up the incline of track means 27 first passes over first pulley 36, then beneath counterweight pulley 38, then over second pulley 37, and is connected to counterweight 35, so that three lengths 39, 40 and 41 of cable move in the pulley arrangement 34 to support counterweight 35. Counterweight 35 thus moves at one-third the velocity and one-third distance of carrier 28 on track means 27.

If the weight of counterweight 35 was chosen so that its effective weight equaled the force required to pull carrier up the incline of track means 27, empty carrier 28 and counterweight 35 would be balanced and winch drum would have to apply force sufficient to pull only the load of the carrier up the incline; however, counterweight 35 is increased in weight beyond that weight necessary to balance carrier 28 and a smaller force is required to move the loaded carrier up the incline. Counterweight 35, the incline of track means 27, the weight of the empty carrier 28, and the weight of the carrier and its load are matched so that winch drum 32 applies approximately the same force to the cable to move the loaded carrier 28 up track means 27 as it does to move the unloaded carrier back down the track means. Since counterweight 35 is supported by three lengths of cable 31, the actual weight of the counterweight must be three times as heavy as its effective weight, which is the weight actually applied to carrier 28 through cable 31. In computing the effective counterweight of hoist means 13, the following relationship is established:

$$CWe = \frac{\sin a\ (2\ Wc + Wl)}{2}$$

where $CWe$ is the effective counterweight, $a$ is the maximum angle of incline of the carrier path, $Wc$ is the weight of the empty carrier, and $Wl$ is the weight of the load or batch of mix carried by the carrier. When the incline of track means 27 is 45°, the weight of the empty carrier 28 is 4,000 pounds, and the weight of the batch of mix to be transported by the carrier is 6,000 pounds, the effective counterweight would be computed as follows:

$$CWe = \frac{\sin 45°\ (2 \times 4000\ lbs. + 6000\ lbs.)}{2}$$

$$CWe = \frac{0.707 \times 14000}{2} = 4949\ lbs.$$

The actual counterweight will be three times the effective counterweight because of the three lengths 39, 40 and 41 of supporting cable 31.

When the effective counterweight is computed as above, the motor force up, or weight the hoist motor is required to move when moving the loaded carrier 28 up the incline of track means 27, is computed as follows:

MFup = sin a (Wc + Wl) − CWe

Where the effective counterweight is established as computed above, the motor force up will be:

MFup = 0.707 (4000 lbs. + 6000 lbs.) − 4949 lbs.
MFup = 2121 lbs.

Since the effective counterweight, 4,949 pounds, is more than the weight applied by the empty carrier 28 as the empty carrier moves down the incline of track means 27, 2828 pounds, the motor is required to lift the counterweight in order to move the carrier 28 down the incline of track means 27. The motor force down, or weight of the effective counterweight not balanced by the empty carrier moving in a downward direction, is computed as follows:

MF down = CWe − sin a Wc

In the preceding example, the motor force down is computed:

MF down = 4949 lbs. − 0.707 × 4000 lbs.
MF down = 4949 lbs. − 2828 lbs. = 2121 lbs.

It should be noted that when the effective counterweight is computed in the manner illustrated above, the motor is required to exert 2,121 lbs. on the loaded carrier to move the loaded carrier up the incline of the track means at approximately the same motor force required to move the empty carrier down the incline of the track means. By contrast, if no counterweight was used the motor would be required to exert 7,070 lbs. on the carrier to move the carrier up the incline, or if a counterweight which only equalled the weight of the empty carrier were used the motor would be required to exert 4,242 lbs. to move the loaded carrier up the incline. Of course, the weight of each batch dispensed to carrier 28 will vary somewhat so that the carrier in its fully loaded condition will not always have the same total weight. Thus, the counterweight is computed for the maximum capacity rating of carrier 28.

Counterweight 35 moves up and down counterweight guides 45 which are vertically oriented adjacent storage hopper 12. Shock absorber 46 is mounted on platform 47 at the lower end of counterweight guides 45 and is arranged to stop the downward movement of counterweight 35. Fluid motor 33 (FIG. 2) is attached to winch drum 32 and is located at the upper end of the truss of track means 27. Fluid drive means 48 are mounted on platform 47 and main circuit fluid lines 49 and 50 communicate between fluid drive means 48 and fluid motor 33. Fluid drive means 48 comprises a liquid reservoir or sump 65 for maintaining a supply of fluid, such as oil, and a fluid pump such as variable displacement radial piston pump 51.

Figure 2:
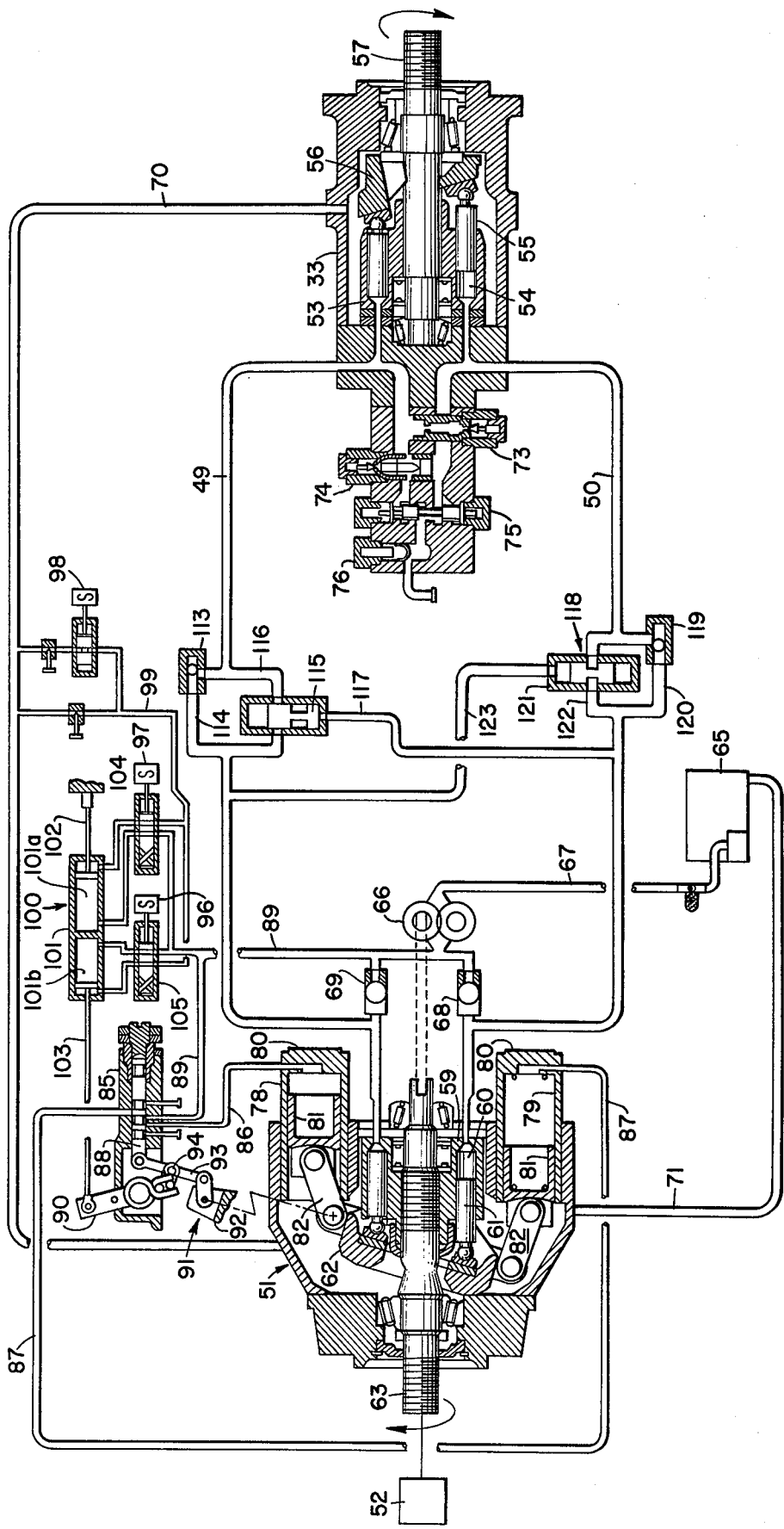
FIG. 2 is a schematic illustration of the control system for the hoist.

As is illustrated in FIG. 2, fluid motor 33 is a fixed displacement multiple piston motor having a rotatable cylinder block 53 defining a plurality of cylinders 54 radially disposed about its axis of rotation and with the longitudinal axis of each cylinder disposed parallel to each other. A piston 55 is positioned in each cylinder 54 and is arranged to engage stationary swash plate 56. As rotatable cylinder block 53 rotates, its pistons 55 reciprocate in cylinders 54. Output shaft 57 is rigidly connected at one end to rotatable cylinder block 53 and at its other end to winch drum 32 at the top of track means 27.

Variable displacement pump 51 also comprises a rotatable cylinder block 59 which defines a plurality of radially disposed parallel cylinders 60, and a piston 61 is reciprocably received in each cylinder 60. 2,828 swash plate 62 causes pistons 61 to reciprocate in their cylinders 60 upon the rotation of cylinder block 59. Swash plate 62 is tiltable between the positions shown in FIG. 2, through a neutral position where it is perpendicular to the axis of rotation of cylinder block 59, to a reverse tilt position beyond its neutral position. Drive shaft 63 is rigidly connected at one of its ends to rotatable cylinder block 59 and at its other end to a power means 52 such as a deisel engine or an electric motor.

Main fluid circuit conduits 49 and 50 communicate through the ends of the housings of pump 51 and motor 33 so that the cylinders of the pump cylinder block communicate with the cylinders of the motor cylinder block. When swash plate 62 of pump 51 is tilted to the position illustrated and the cylinder block is rotated under the influence of the power means 52 connected to the input shaft 63, the oil in the system will be pumped by pump 51 through conduit 49 to motor 33, whereupon motor 33 will rotate. The oil passing through motor 33 will be returned through conduit 50 to the inlet side of pump 51.

Charge pump 66 has its inlet connected through conduit 67 to reservoir or sump 65. The outlet of charge pump 66 communicates with both conduits 49 and 50 and functions to charge either conduit 49 or 50 with oil so that the conduits 49 and 50 are always filled with oil. Check valves 68 and 69 are positioned in the conduits so that the oil flowing away from pump 51 will not flow toward charge pump 66. Since there is oil leakage about the pistons 61 of pump 51 and pistons 55 of motor 33, the oil leaking about the pistons is allowed to flow into the housings of the pump and motor and lubricate the internal working parts of the pump and motor. The excess oil from the motor housing is passed from motor housing through conduit 70 to the pump housing, and the excess oil from the pump housing which passes about pump pistons 61 and which is received from the motor housing is passed through conduit 71 back to reservoir 65. Thus, the continual leakage about the pump and motor pistons is utilized to lubricate and cool the working parts of the pump and motor.

The oil from charge pump 66 that passes through one of the check valves 68 and 69 enters the low pressure side of the main fluid circuit between pump 51 and motor 33, and the other check valve 68 or 69 is held closed by the oil under high pressure on the high pressure side of the main circuit. The oil flows in the main circuit in a continuous closed loop, from the outlet of pump 51 to fluid motor 33, then from the outlet of the fluid motor back to the inlet of the pump. The quantity of fluid flow in the main circuit is determined by pump speed and the displacement of the pistons of the pump, which is a result of the degree of tilt of swash plate 62. Normally, the pump speed will be approximately constant so that the quantity of oil flow is primarily determined by the degree of tilt of swash plate 62.

High pressure relief valves 73 and 74 communicate with the main circuit and function to allow the high pressure side of the main circuit to communicate with the low pressure side when the system is overloaded. This prevents rupture of the conduits and other flow passages of the system. Also, shuttle valve 75 is connected between the high and low pressure sides of the system so that the low pressure side of the system always communicates with pressure relief valve 76. Pressure relief valve 76 limits the high pressure on the low pressure side of the main circuit.

Servo motors 78 and 79 are connected to swash plate 62 of pump 51, and each includes a cylinder 80, piston 81 reciprocal in a cylinder 80, and connecting link 82 connected to swash plate 62. Servo motor 78 communicates with control valve 85 through conduit 86, while servo motor 79 communicates with control valve 85 through conduit 87. Control valve 85 comprises valve spool 88 which reciprocates in a valve bore that communicates through conduit 89 with charge pump 66, and when valve spool 88 is moved to the left, the pressure from charge pump 66 communicates through conduit 89 and conduit 86 to servo motor 78 while the oil in servo motor 79 is allowed to be expelled through conduit 87 and valve 85. This results in servo motor 78 tilting swash plate 62 to a new position.

Valve spool 88 moves in valve 85 by the pivoting of control handle 90. Control handle 90 is connected to a feedback linkage 91 which comprises follower arm 92 rigidly connected to swash plate 62 and connecting link 93. When control handle 90 is pivoted in a clockwise direction, connecting link 93 tends to move control valve spool 88 to the left, thus charging servo motor 78 while discharging servo motor 79. As servo motor 78 is charged and tilts swash plate 62 in a counterclockwise direction, follower arm 92 will also move in a counterclockwise direction, causing connecting link 93 to pivot about its fulcrum 94 and shift control valve spool 88 back to its original position. Thus, swash plate 62 functions to change the amplitude of the stroke of the pistons of pump 51 in response to the movement of control handle 90, and after the swash plate has been approximately repositioned, its repositioning movement ceases and the system stabilizes. If control handle 90 is moved in a counterclockwise direction to thrust control valve spool 88 to the right, charge pump 66 functions to charge servo motor 79 and tilt swash plate 62 in a clockwise direction. Again, follower arm 92 will pivot connecting link 93 in response to the tilting of the swash plate about fulcrum 94 to pull control valve spool 88 back to its original centered position and to terminate further charging of servo motor 79 and further tilting of the swash plate.

At various positions along track means 27, or alternatively, at various positions along the counterweight guides 45, a plurality of detecting means 107, 108, 109 and 110 are placed so as to detect the position of carrier 28 along track means 27 as the carrier moves along the track. The detecting means can comprise photoelectric cells, wand actuated switches, or various other conventional devices for detecting the presence of an object as it moves past a predetermined point. The detecting means are spaced along track means 27 and function to actuate solenoids 96, 97 and 98 (FIG. 2). The solenoids comprise a part of the control system for controlling the movement of carrier 28 through control handle positioning means 100. Control handle 90 which functions to reposition swash plate 62 is operated by control handle positioning means 100 which comprises a double cylinder 101, stationary piston 102, and connecting piston 103. Control valves 104 and 105 each communicate with charge pump 66 and with return flow conduit 70 and function to alternately charge the opposite ends of the double cylinders 101 with oil from charge pump 66.

Solenoids 96 and 97 function to shift control valves 104 and 105 in response to the movement of the carrier along track means 27. For instance, if the control handle positioning means 100 is in the position shown and the swash plate 62 of pump 51 is tilted as illustrated, the pump 50 operates to drive fluid motor 33 at substantially maximum speed to move carrier 28 up the incline of track means 27. As the carrier approaches the upper end of storage hopper 12, the detecting means 107 detects the movement of the carrier past this point and causes its solenoid 97 to shift control valve 104 from the position illustrated in FIG. 2 to its position where charge pump functions to charge the opposite end of double cylinder 101a. This causes double cylinder 101 to move to the right and pull control handle 90 in a clockwise direction. The movement of the control handle in this direction causes control valve spool 88 to shift to the left and charge servo motor 78, whereupon swash plate 62 will tilt back toward its neutral position. This causes a decreasing amount of fluid to be displaced by pump 51, and motor 33 slows down. As carrier 28 continues to decelerate up the incline of track means 27, detecting means 108 detects this movement and actuates solenoid 98 in the exhaust conduit 99 to rapidly exhaust all of the remaining fluid from cylinder 101a, whereupon control handle 90 will be abruptly moved to its neutral position. This causes swash plate 62 to be rapidly moved to its neutral position and the pump 51 will no longer function to operate motor 33. The clam gates 30 at the bottom of carrier 28 are automatically opened as the carrier reaches the end of its upward movement by conventional cam-linkage structure (not shown).

When carrier 28 is to be returned down the incline of track means 27 to mixing plant, solenoid 96 is energized either manually or through a time delay, to shift connecting piston 103 in cylinder 101b of double cylinder 101. This causes control handle 90 to move further in a clockwise direction and further shift control valve spool 88 to the left, whereupon charge pump 66 functions to charge servo motor 78 with more fluid. The further charging of servo motor 78 tilts swash plate 62 from its neutral position further in a counterclockwise direction, and pump 51 thereupon begins to charge conduit 50 of the main circuit and operates fluid motor 33 in the opposite direction. Solenoid valve 98 is closed upon the actuation of solenoid 96. As carrier 28 approaches the lower end of mixing plant 11, its movement is detected by detecting means 109, whereupon solenoid 96 is actuated to reverse its control valve 105, to reverse the charging of cylinder 101b and return connecting piston and control handle toward their neutral positions. Just as carrier 28 reaches its receiving position below mixing plant 11, detecting means 110 detects its movement and again operates solenoid valve 98 to rapidly deplete the fluid from cylinder 101b, so that control handle 90 is rapidly repositioned to its neutral position. This causes carrier 28 to come to rest beneath the discharge chute 15 of the mixing plant.

When the carrier is to be moved up the incline of track means 27, solenoid 97 is energized, either manually or automatically so that charge pump 66 passes fluid pressure through control valve 104 to double cylinder 101, causing the double cylinder to shift back to the position illustrated and to tilt swash plate 62 back to the position illustrated. This causes carrier 28 to begin its movement up the incline of track means 27.

Conduits 49 and 50 in the main circuit between pump 51 and motor 33 each have a load holding valve located therein. Load holding valve 112 in conduit 49 comprises check valve 113 in branch conduit 114, and spring-loaded shuttle valve 115 in branch conduit 116. Control conduit 117 communicates with the end of shuttle 115 opposite from its spring and with conduit 50. Load holding valve 118 is a duplicate of load holding 112 and also comprises check valve 119 in branch conduit 120, shuttle valve 121 in branch conduit 122, and control conduit 123 which communicates between shuttle valve 121 and conduit 49. When swash plate 162 is tilted to the position illustrated in FIG. 2, conduit 49 of the main fluid circuit is charged with high pressure and conduit 50 becomes the low pressure conduit. Shuttle valve 115 therefore remains closed and check 113 opens in response to the high pressure oil flow through branch conduit 114. Shuttle valve 121 is urged by the high pressure fluid through control conduit 123 to its opened position and the fluid being discharged from fluid motor 33 is permitted to flow through shttle valve 121 and back to the inlet of pump 51. Check valve 119 remains closed. In the event that pump 51 fails or conduit 49 ruptures upstream from load holding valve 112, shuttle valve 121 will close upon the depletion of pressure in its control conduit 123, and motor 33 will no longer be permitted to discharge its fluid through conduit 50. This results in stopping the motor. In addition, if the force of the load on motor 33 tends to reverse the motor, check valve 113 of load holding valve 112 will close. This locks the other conduit so that the fluid both to and from motor 33 is locked in the motor and the motor will not be permitted to freewheel. Load holding valves 112 and 118 function in an identical manner.

The power means 52 used to continuously drive cylinder block 59 of pump 51 is arranged to operate continuously although the operation of hoist means 13 is intermittent. When the carrier 28 of the hoist means is to be moved, the acceleration of the carrier 28 is smooth from standstill to high speed by virtue of the fact that the gradual tilting of swash plate 62 causes a gradual increase in fluid displacement through the main conduit to fluid motor 33 so that the fluid motor smoothly and continuously accelerates as the swash plate 62 is being tilted. When swash plate 62 stops tilting and rests in a tilted attitude, fluid motor 33 operates at a constant speed. The back pressure of variable displacement pump 51 tends to cause swash plate 62 to assume a neutral position against the force of servo motors 78 and 79; however, servo motors 78 and 79 are continuously charged by charge pump 66 until the setting of control handle 90 is reached by swash plate 62, and if there is any creepage of the swash plate 62 from its set position, feedback linkage 91 causes control valve spool 88 to recharge the appropriate servo motor 78 or 79 to reposition the swash plate.

As is illustrated in FIG. 1, the lower portion 129 of track means 27 is hinged at 130 so that it can move from the position illustrated to a horizontal position. Rail lifting assembly or winch 131 comprises rotatable drum 132, and cable 133 from drum 132 is connected to the lower end of the lower portion 129 of track means 27. Winch 131 thus functions to elevate the lower portion of the track means so that a load carrying vehicle such as a dump truck can move freely beneath the discharge chute 15 of the mixing plant 11 to receive a batch of mix from the discharge chute. When the dump truck moves out from beneath the discharge chute, winch 131 operates to reposition the lower end of track means 27 to the position illustrated and carrier 28 can then be moved down the incline of track means 27 to the position illustrated.

While this invention has been described in detail with particular reference to the preferred embodiment thereof, it will be understood that variations and modifications can be effected within the spirit and scope of the invention as described hereinbefore and as defined in the appended claims.

We claim:

1. In combination, a bituminous mixing plant or the like including a mix discharge chute spaced above ground level, a first vehicle loading station defined below said mixing plant discharge chute for gravity loading transport vehicles with bituminous mix from said mixing plant discharge chute, a mix storage hopper positioned adjacent said mixing plant and including a mix discharge chute spaced above ground level, a second vehicle loading station defined below said storage hopper discharge chute for gravity loading transport vehicles with bituminous mix from said storage hopper discharge chute, hoist means comprising track means extending at an angle of incline between said mixing plant discharge chute and the upper portion of said mix storage hopper, a carrier movable along said track means, said carrier rated for carrying a maximum weight capacity; a cable connected to said carrier and extending up the track means; a counterweight; pulley means cooperating with said cable for supporting said counterweight with a plurality of lengths of said cable; and drive means connected to said cable for driving said carrier up and down said track means, the angle of incline of said track means, the weight of said carrier, the approximate maximum weight capacity rating of said carrier, and the effective weight of said counterweight being matched so that the force applied by said drive means to move a fully loaded carrier up the track means is approximately the same as the force applied by said drive means to move the empty carrier down the track means.

2. The combination of claim 1 and wherein said drive means comprises a fluid driven motor including a plurality of motor pistons contained in parallel relationship in a rotatable cylinder block with each motor piston engageable with a stationary swash plate, and a pump including a plurality of pump pistons contained in parallel relationship in a rotatable cylinder block with each pump piston engageable with a tiltable swash plate, and control means for tilting said tiltable swash plate in response to the movement of said carrier along said track means.

3. The combinaton of claim 1 and wherein said drive means comprises a fluid powered drive means and includes braking means for holding said carrier in a stationary position on said track means upon depletion of fluid pressure to said fluid powered drive means.

4. The combination of claim 1 and wherein said track means comprises a foldable portion at the mixing plant discharge chute, and means for folding the foldable portion of said track means upwardly.

5. The combination of claim 1 and wherein the effective weight of said counterweight, the maximum weight capacity rating of said carrier, the weight of said carrier and the angle of incline of said track means are constructed in accordance with the relationship:

$$\text{effective counterweight} = \frac{\sin a \, (2 \, Wc + Wl)}{2}$$

where $a$ is the steepest angle of incline from the horizontal, $Wc$ is the weight of the carrier and $Wl$ is the maximum weight capacity rating of the carrier.

6. A bituminous mixing plant, comprising:
a mix discharge chute connected to said mixing plant and spaced above ground level;
a first vehicle loading station defined below said mixing plant discharge chute for gravity loading transport vehicles with bituminous mix from said mixing plant discharge chute;
a mix storage hopper positioned adjacent said mixing plant and including a mix discharge chute spaced above ground level;
a second vehicle loading station defined below said storage hopper discharge chute for gravity loading transport vehicles with bituminous mix from said storage hopper discharge chute;
hoist means comprising track means extending at an angle of incline between said mixing plant discharge chute and the upper portion of said mix storage hopper;
a carrier movable along said track means, said carrier rated for carrying a maximum weight capacity;
a cable having one end connected to said carrier and extending up the track means;
a counterweight connected to the other end of said cable;
pulley means cooperating with said cable for suspending said counterweight by three lengths of said cable means whereby the amplitude of movement of said carrier is three times the amplitude of movement of said counterweight; and,
drive means connected to said cable for driving said carrier up and down said track means, the angle of incline of said track means, the weight of said carrier, the approximate maximum weight capacity rating of said carrier, and the effective weight of said counterweight being matched so that the force applied by said drive means to move a fully loaded carrier up the track means is approximately the same as the force applied by said drive means to move the empty carrier down the track means.

7. The combination of claim 6 and wherein the effective weight of said counterweight, the maximum weight capacity rating of said carrier, the weight of said carrier, and the angle of incline of said track means are constructed in accordance with the relationship:

$$\text{effective counterweight} = \frac{\sin a\,(2\,Wc + Wl)}{2}$$

where $a$ is the steepest angle of incline from the horizontal, $Wc$ is the weight of the carrier and $Wl$ is the maximum weight capacity rating of the carrier.

* * * * *

UNITED STATES PATENT OFFICE
CERTIFICATE OF CORRECTION

Patent No. 3,874,523            Dated April 1, 1975

Inventor(s) James Donald Brock et al.

It is certified that error appears in the above-identified patent and that said Letters Patent are hereby corrected as shown below:

Column 5, line 19, "2,828" should read -- Tiltable --.

Signed and Sealed this twenty-ninth Day of July 1975

[SEAL]

Attest:

RUTH C. MASON
*Attesting Officer*

C. MARSHALL DANN
*Commissioner of Patents and Trademarks*